UNITED STATES PATENT OFFICE.

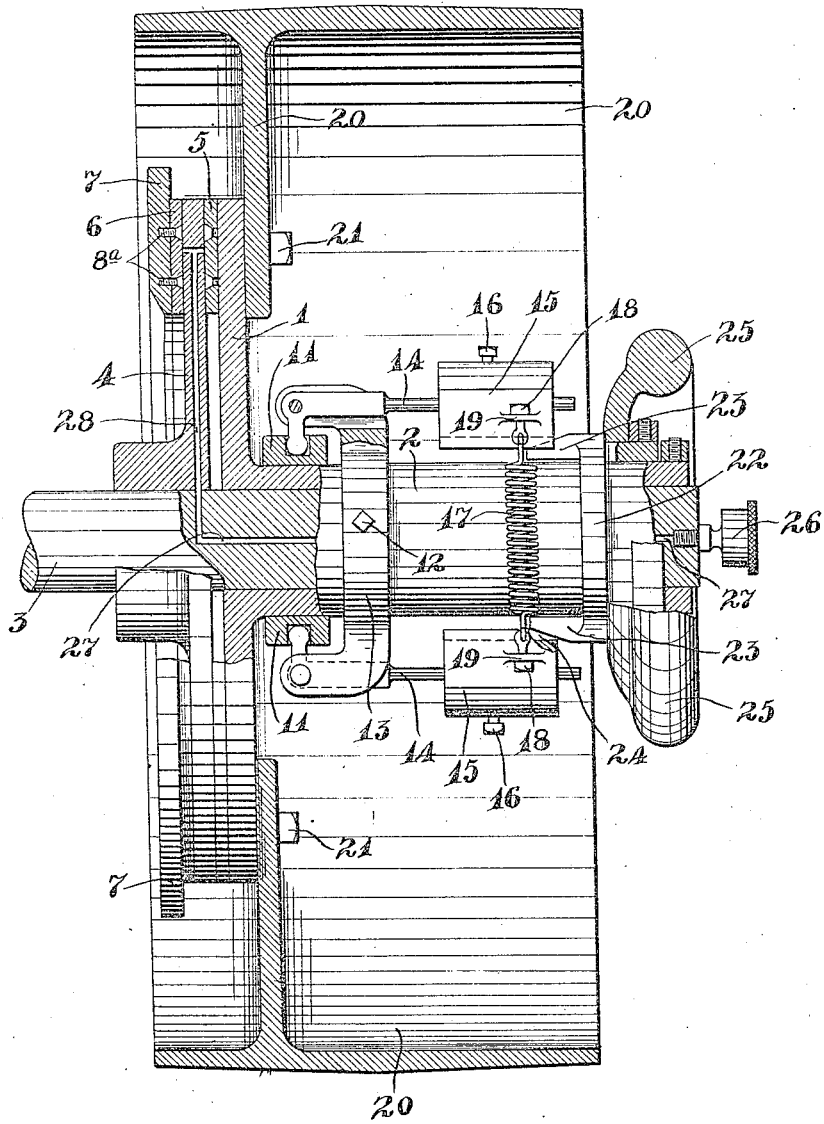

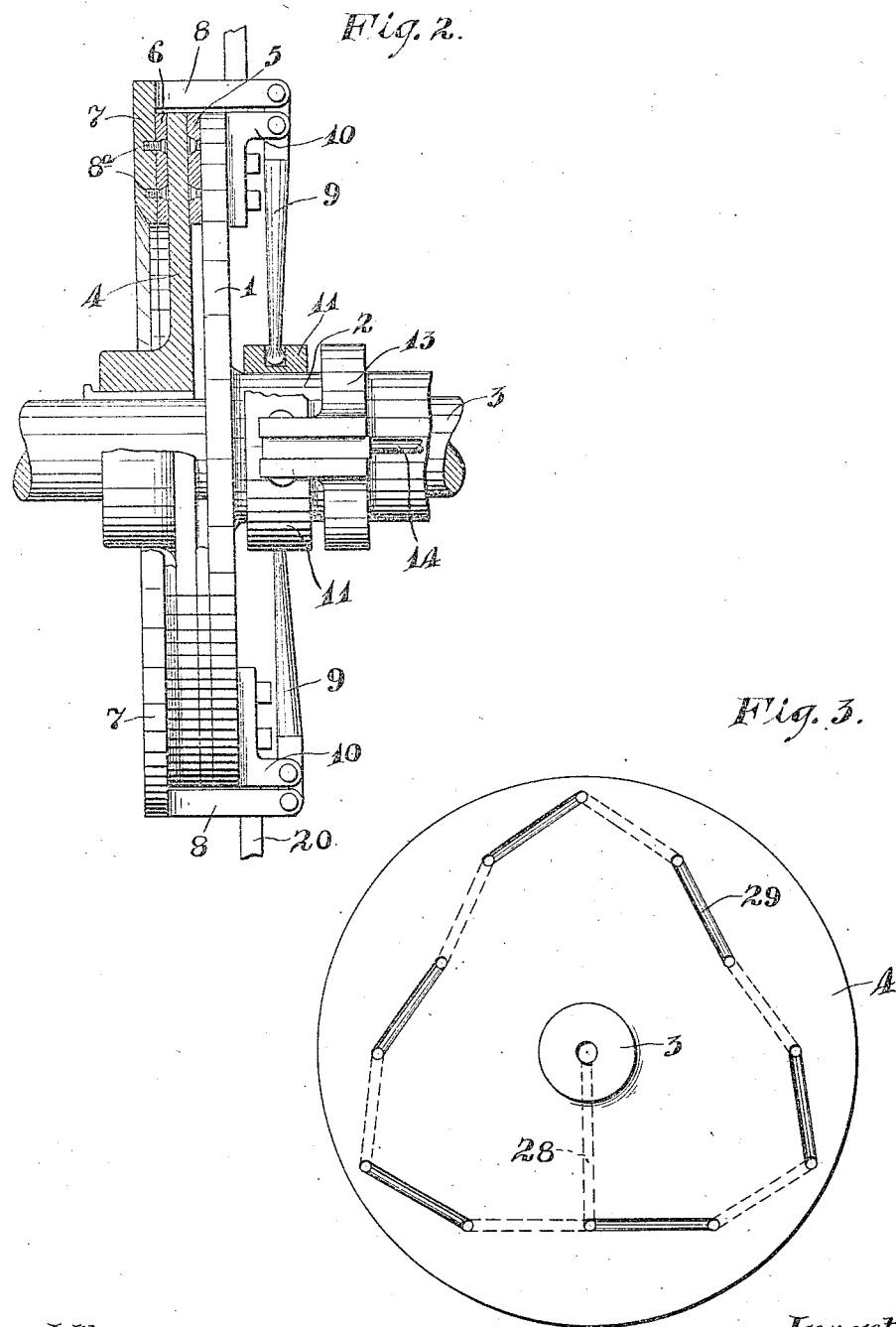

ALBERT G. HINZ, OF MINNEAPOLIS, MINNESOTA.

GOVERNOR-CONTROLLED FRICTION-CLUTCH.

987,987.  Specification of Letters Patent. Patented Mar. 28, 1911.

Application filed June 6, 1910. Serial No. 565,178.

*To all whom it may concern:*

Be it known that I, ALBERT G. HINZ, a citizen of the United States, residing at Minneapolis, in the county of Hennepin and State of Minnesota, have invented certain new and useful Improvements in Governor-Controlled Friction-Clutches; and I do hereby declare the following to be a full, clear, and exact description of the invention, such as will enable others skilled in the art to which it appertains to make and use the same.

My invention has for its object to provide a simple and efficient governor-controlled friction clutch, and to this end, the invention consists of the novel devices and combination of devices hereinafter described and defined in the claims.

In the accompanying drawings which illustrate the invention, like characters indicate like parts throughout the several views.

Referring to the drawings: Figure 1 is a view chiefly in vertical section, but with some parts in full elevation, showing a friction clutch and coöperating governor arranged in accordance with my invention; Fig. 2 is a view partly in plan and partly in horizontal section, showing the improved clutch mechanism, some parts being broken away; and Fig. 3 is a view in elevation, looking at the face of the clutch engaged disk or driving member.

In the drawings, a rotary driven member in the form of a disk 1 is provided with a sleeve like hub 2. This hub 2 is rotatively mounted on a driving shaft 3. The driving member as shown, is also in the form of a disk 4, the hub of which is rigidly secured to the said shaft 3. The two disk like members 1 and 4 are slightly spaced apart, and the former is provided with an annular friction plate or ring 5 that engages with the adjacent face of the driving disk 4. A similar friction ring 6 engages the opposite face of said disk 4, and this ring is shown as secured to a metallic supporting ring 7 having a multiplicity of laterally projecting arms of long lugs 8. The rings 5 and 6 are both preferably constructed from wood fiber, and as shown, they are detachably secured respectively to the disk 1 and ring 7, by screws 8ᵃ. The outer ends of the clutch levers 9 are pivoted to the ends of the lugs 8 and are also pivoted to brackets 10 secured to the driven member or disk 1. The inner ends of the levers 9 engage seats formed in a shipper ring 11, that is mounted to slide on the sleeve 2. Rigidly secured on the sleeve 2, as shown by means of the said screw 12, is a collar 13, having bifurcated lugs to which bell-crank levers 14 are pivoted. The short inturned ends of the bell-cranks 14 are seated in the shipper ring 11, while quite heavy weights 15 are applied to the long and approximately parallel ends of the said bell-cranks. Preferably, the weights 15 are adjustably secured on the bell-cranks 14, by means of set screws 16. The two weights 15 are connected by one or more tension springs 17, the said connection being preferably made adjustable by nut equipped coupling bolts 18 applied to the ends of the said spring and passed through perforated ears 19 on the said weights. The tension of spring 17 draws the weights 15 toward each other, and, acting through the bell-cranks 14 and clutch levers 9, normally presses the friction rings 5 and 6 tightly against the opposite faces of the driving disk 4. Hence, as is evident, the rotation of the driving member 4 will rotate the driven member 1 until a certain pre-determined speed throws the weights 15 apart against the tension of the spring, and thereby releases the friction rings 5 and 6 from the said driving member 4. Hence, the driving member, when running above the desired speed, will rotate the driven member only at the predetermined maximum speed. This predetermined maximum speed may be varied either by adjustments of the weights 15 on the bell-cranks or by adjustments of the tension of the spring or springs 17.

The shaft 3 being secured for rotation with the disk 4, serves as a part of the driving member and may be assumed to be an engine crank shaft. Power supplied from an engine or motor may be transmitted to the so-called driving member of the clutch mechanism in various different ways. As shown in the drawings, a pulley 20 is detachably secured thereto by machine screws 21. Pulleys of different size or suitable sprockets may, when desired, be substituted for the pulley shown in Fig. 1 of the drawings.

It is sometimes desirable to throw the clutch out of action for a considerable period of time. To provide a simple device for accomplishing this while the clutch mechanism is in motion, a tripping collar 22 is slidably mounted on the sleeve 2 and is provided with beveled cam lugs 23, which, as shown, engage grooves 24, formed in the inner faces of the weights 15. A hand wheel 25 is swiveled on the outer end of the trip collar 22 and is adapted to be held in the hand and used to slide the collar 22 into and out of an operative position while the said collar 22 is being rotated with the sleeve 2.

I also provide improved devices for supplying oil to the frictionally engaging surfaces of the members 4, 5 and 6. For this oil, the device includes an oil supply cup 26, provided with a tubular stem threaded into the end of the shaft 3 and communicating with an axial oil passage 27 of said shaft. The oil passage 27 terminates into a radially extended inner extremity that communicates with an oil passage 28 formed in, and extended radially of the driving disk 4. The outer extremity of the passage 28 is connected to a zigzag oil channel or passage 29 formed in and extending around the disk 4. This zigzag oil channel 29 makes a complete circuit from the outer extremity of passage 28, varies its distance from the axis of said disk 4, and has its sections or channels opened alternately, first at one side and then at the other of said disk 4. This gives a good supply of oil over that entire surface of said disk 4 which is engaged by the friction rings 5 and 6.

A governor actuated friction clutch of the character described is capable of general use wherever it is desirable to limit the maximum speed of a machine or mechanism. One of the best examples of this is found where dynamos are driven from explosive engines. The speed of an explosive engine is liable to vary to a considerable extent and if a dynamo be driven beyond a predetermined maximum speed at which it is designed to run, it is liable to be burned out. A governor-controlled friction clutch such as described, when used in the power transmission mechanism between an explosive engine and a dynamo, removes all danger due to excessive speed of the dynamo and furthermore, prevents certain fluctuations in the circuit supplied by the dynamo, such as often are noticed in electric light service, when excessive dynamo speed is produced. The clutch mechanism, however, as already indicated, will be found serviceable in numerous other places. For instance, fanning mills and cream separators, should not, for well known reasons, be driven above predetermined speeds.

What I claim is:

1. The combination with rotary driving and driven members, of a friction clutch normally connecting the said members for common rotation, a centrifugal governor, with connections normally holding said clutch operative, and a governor tripping device operative on said governor at will, to cause the same to release said clutch.

2. The combination with rotary driving and driven members, the latter having a sleeve like hub, of a friction clutch normally connecting said driving and driven members for common rotation, a centrifugal governor with connections for actuating said clutch, said governor comprising a pair of weighted levers carried by the hub of said driving member, a spring yieldingly drawing said levers toward said hub, a tripping collar slidably mounted on said hub and having cam lugs engaging the said weighted levers, and an end piece swiveled to the said tripping collar.

3. The combination with a driving disk and a driven disk, of a pair of friction rings engageable with the opposite faces of said driven disk, one of said friction rings being secured to the said driven disk and the other being loose, levers pivotally connected to projections from said loose friction ring and from said driving disk, a shipper ring slidably mounted on the hub of said driven member and engageable with the inner ends of the said clutch levers, and a centrifugal governor carried by the hub of said driven member, connected to said shipper ring and provided with a spring operating through said connections to normally hold said friction rings clamped onto the said driven disk.

4. The combination with a shaft, of a driven member rotatively mounted on said shaft, a disk like driving member secured to said shaft, a clutch for connecting the said driving and driven members, and including friction rings engageable with the opposite faces of said driving disk, an oil cup applied to one end of said shaft, and an oil delivery passage extending axially of said shaft, thence radially outward in said driving disk, and thence terminating in a zigzag oil channel opening alternately at the opposite faces of said driving disk.

In testimony whereof I affix my signature in presence of two witnesses.

ALBERT G. HINZ.

Witnesses:
 ALICE S. WILLIAMS,
 HARRY D. KILGORE.